UNITED STATES PATENT OFFICE.

CARL BOSCH, ALWIN MITTASCH, AND CHRISTOPH BECK, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION OF GERMANY.

MANUFACTURE OF OXIDS OF NITROGEN.

1,207,706.   Specification of Letters Patent.   Patented Dec. 12, 1916.

No Drawing.   Application filed February 25, 1915. Serial No. 10,625.

*To all whom it may concern:*

Be it known that we, CARL BOSCH, ALWIN MITTASCH, and CHRISTOPH BECK, citizens of the German Empire, residing at Ludwigshafen-on-the-Rhine, Germany, have invented new and useful Improvements in the Manufacture of Oxids of Nitrogen, of which the following is a specification.

We have found that the catalytic oxidation of ammonia with the formation of oxids of nitrogen is effected in a very advantageous manner by passing a mixture of ammonia and oxygen-containing gas, such as air or oxygen, over a hot catalytic agent containing at least one oxid of a metal of the iron group (in particular an oxid of iron, manganese, chromium or uranium) and at least one oxid of a rare earth metal, and that very favorable results are obtained, if the catalytic agents contain, besides said constituents a compound of bismuth, for example an oxid of bismuth.

In addition to the above compounds, the catalytic agent may contain other substances, for instance, binding agents, such as calcium oxid, magnesia or alumina, but it is preferred to avoid the presence of certain non-metallic elements and metalloids and compounds thereof, such as sulfuric acid, phosphoric acid, boric acid and silica, or at any rate larger quantities thereof.

The production of the catalytic mixtures can advantageously be carried out by precipitating or calcining mixtures of salts of the components and then forming into suitably shaped pieces or lumps; and we prefer to employ the said catalytic mixtures in a layer, or layers, of small lumps. The proportions of the ingredients can be varied considerably.

The following example will serve to further illustrate the nature of our invention which, however, is not confined to the example. The parts are by weight.

Example: Dissolve 15 parts of ferric nitrate and 1 part of lanthanum nitrate in water and precipitate the hot solution with ammonia. Filter, wash well, form into suitably shaped lumps, dry at 250° C., place the mass in a contact tube and then heat at about 600° C., then pass a mixture of ammonia and air through the mass at about 750° C. In this example instead of lanthanum nitrate, other rare earth metals, or mixtures thereof, in particular the cerite and the yttria earths, can be added and further salts or oxids of another metal of the iron group or of two, or more, of those metals can be employed. Thus, for instance, catalytic mixtures containing ferric oxid and yttrium oxid, or manganese oxid and cerium oxid, or manganese oxid, ferric oxid and didymium oxid may be used. In all cases a compound of bismuth may also be present.

Now what we claim is:—

1. The manufacture of oxids of nitrogen by passing a mixture of ammonia and an oxygen-containing gas over a heated catalytic agent containing at least one oxid of a metal of the iron group and at least one oxid of a rare earth metal.

2. The manufacture of oxids of nitrogen by passing a mixture of ammonia and an oxygen-containing gas over a heated catalytic agent containing at least one oxid of a metal of the iron group and at least one oxid of a rare earth metal and a compound of bismuth.

3. The manufacture of oxids of nitrogen by passing a mixture of ammonia and an oxygen-containing gas over a heated catalytic agent containing at least one oxid of a metal of the iron group and at least one oxid of a rare earth metal and an oxid of bismuth.

4. The manufacture of oxids of nitrogen by passing a mixture of ammonia and an oxygen-containing gas through a layer of separate lumps of a heated catalytic agent containing at least one oxid of a metal of the iron group and at least one oxid of a rare earth metal.

5. The manufacture of oxids of nitrogen by passing a mixture of ammonia and an oxygen-containing gas through a layer of separate lumps of a heated catalytic agent containing at least one oxid of a metal of the iron group and at least one oxid of a rare earth metal and a compound of bismuth.

6. The manufacture of oxids of nitrogen by passing a mixture of ammonia and an oxygen-containing gas through a layer of separate lumps of a heated catalytic agent containing at least one oxid of a metal of the iron group and at least one oxid of a rare earth metal and an oxid of bismuth.

In testimony whereof we have hereunto set our hands in the presence of two subscribing witnesses.

CARL BOSCH.
ALWIN MITTASCH.
CHRISTOPH BECK.

Witnesses:
ARTHUR DENONVILLE,
JOHANNES ACHMEL.